March 25, 1924.  1,488,033
H. G. CLIFTON
DIRECTION SIGNALING APPARATUS FOR MOTOR VEHICLES
Filed July 29, 1920  3 Sheets-Sheet 1
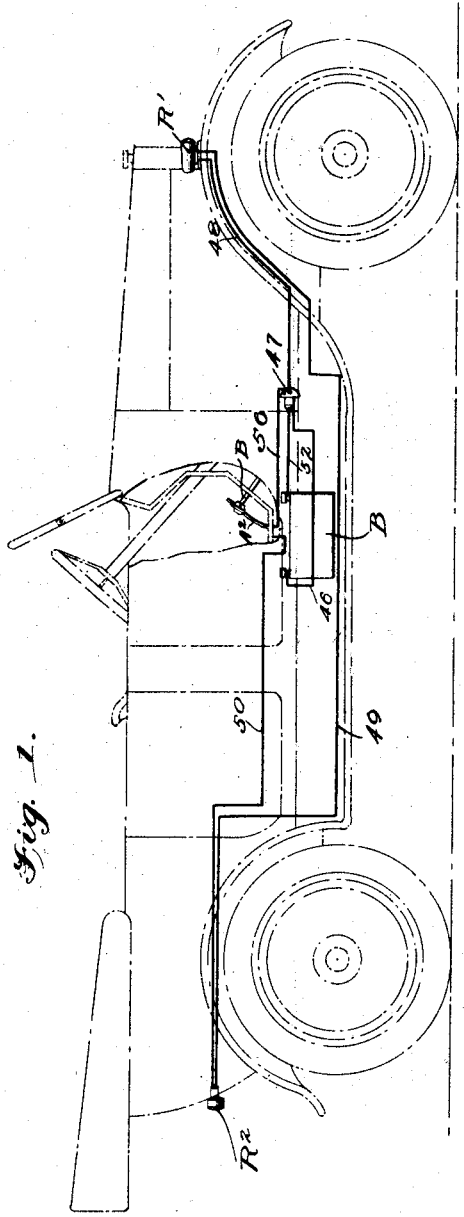
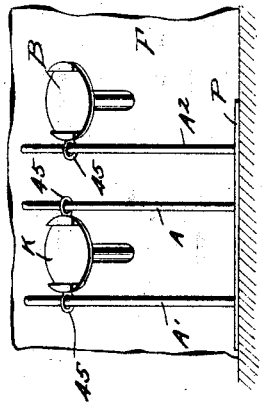
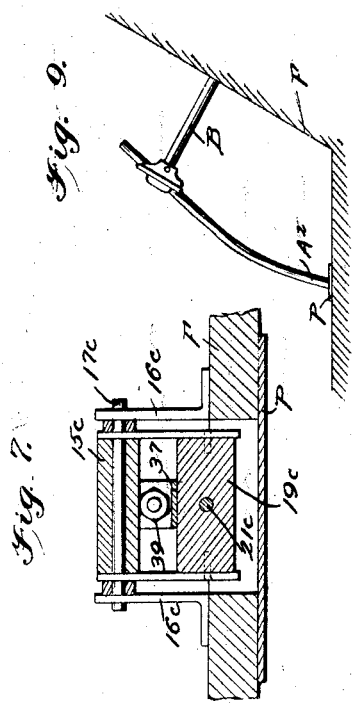
WITNESSES
INVENTOR
Harry G. Clifton,
BY
ATTORNEYS March 25, 1924. 1,488,033
H. G. CLIFTON
DIRECTION SIGNALING APPARATUS FOR MOTOR VEHICLES
Filed July 29, 1920 3 Sheets-Sheet 2
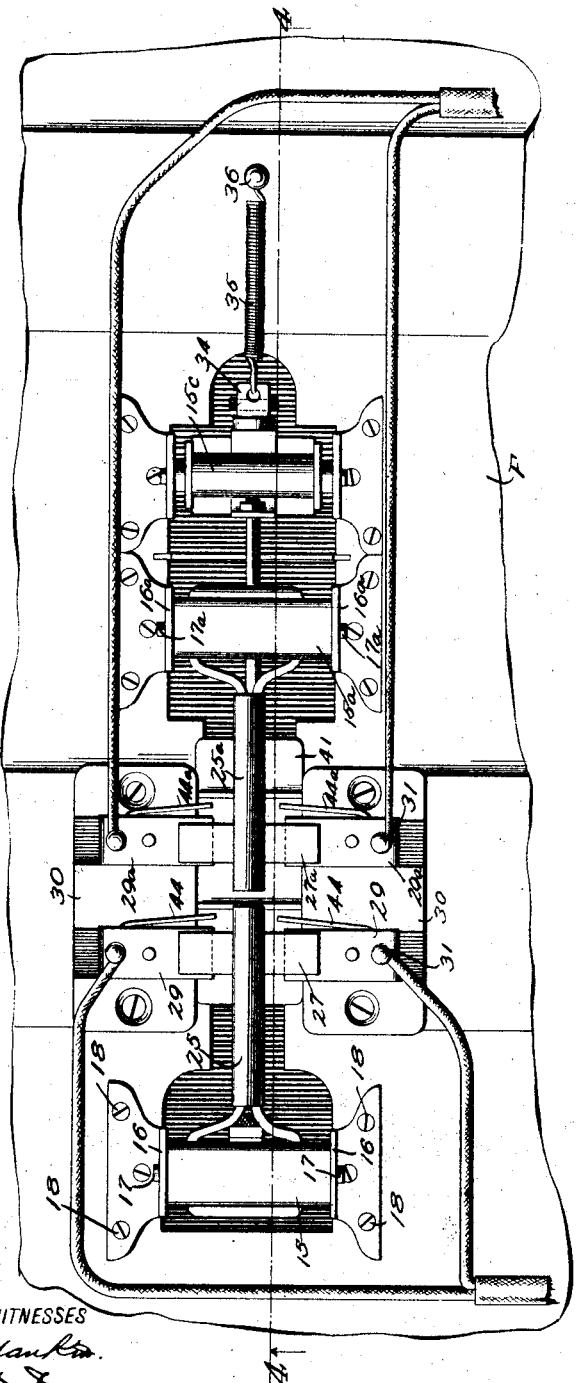
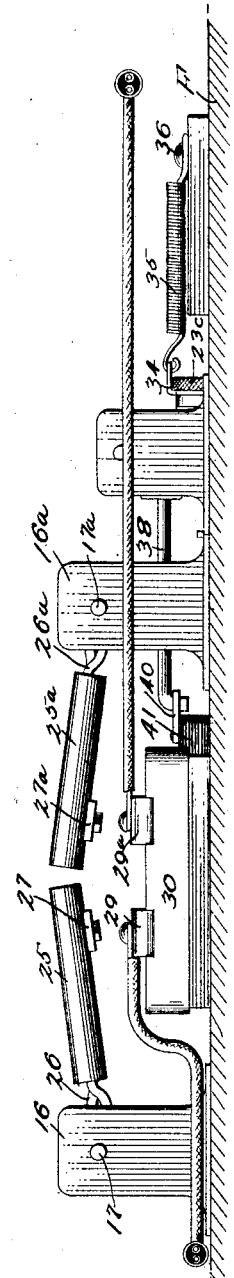
WITNESSES
INVENTOR
Harry G. Clifton,
BY
ATTORNEYS March 25, 1924.  
H. G. CLIFTON  
1,488,033  
DIRECTION SIGNALING APPARATUS FOR MOTOR VEHICLES  
Filed July 29, 1920    3 Sheets-Sheet 3
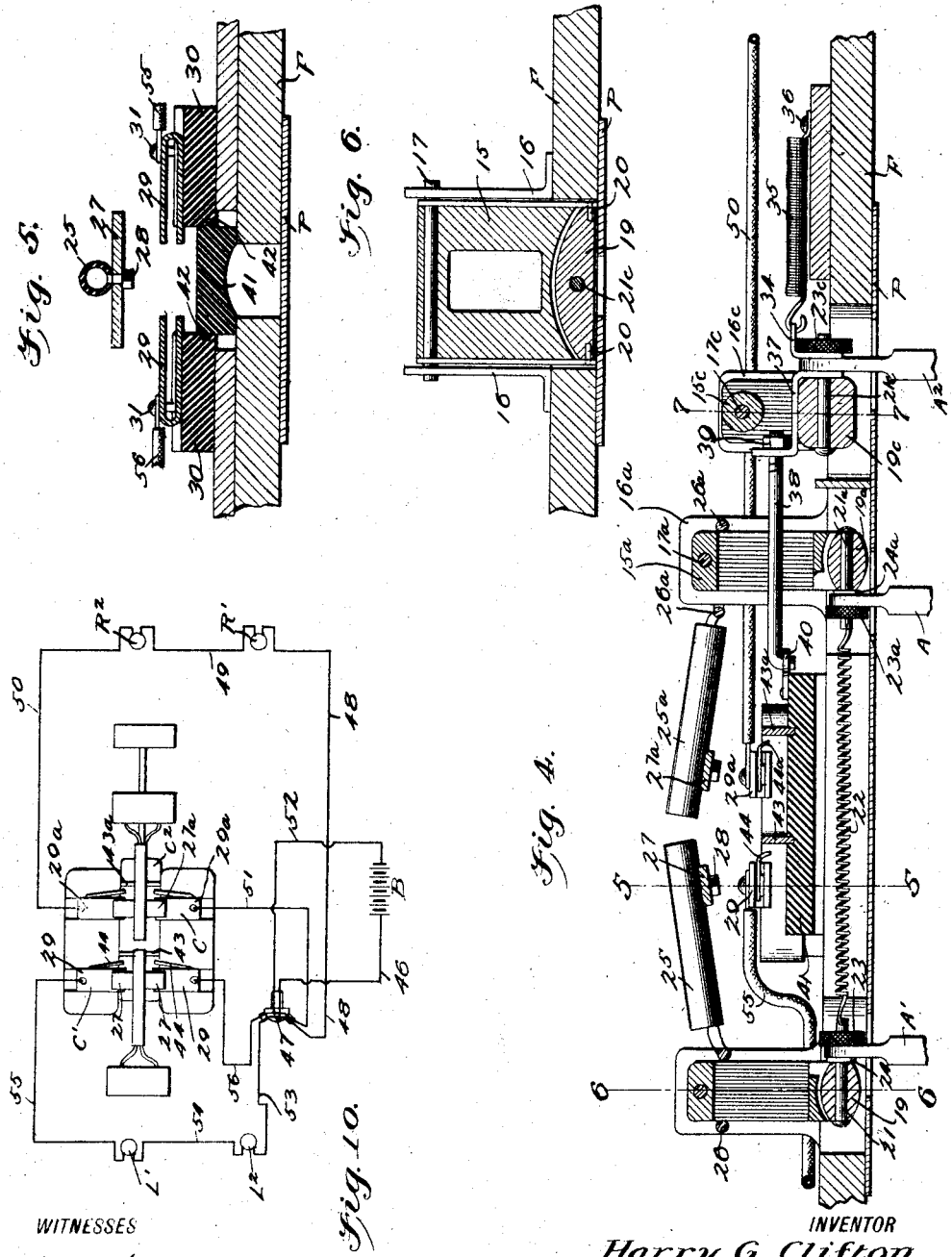
INVENTOR  
Harry G. Clifton,  
BY  
ATTORNEYS Patented Mar. 25, 1924.

1,488,033

UNITED STATES PATENT OFFICE.

HARRY GILMORE CLIFTON, OF JACKSONVILLE, FLORIDA.

DIRECTION-SIGNALING APPARATUS FOR MOTOR VEHICLES.

Application filed July 29, 1920. Serial No. 399,843.

*To all whom it may concern:*

Be it known that I, HARRY GILMORE CLIFTON, a citizen of the United States, and a resident of Jacksonville, in the county of Duval and State of Florida, have invented certain new and useful Improvements in Direction-Signaling Apparatus for Motor Vehicles, of which the following is a specification.

My invention relates to signaling apparatus for motor vehicles for indicating the direction in which a vehicle is about to turn or the diminution of speed of the vehicle.

A purpose of my invention is the provision of a direction-signaling apparatus of this character including lamps having circuits controlled by controllers which are actuated by levers associated with the clutch and brake pedals in a manner to permit actuation thereof by the feet of the driver and irrespective of the position of such pedals.

It is also a purpose of my invention to provide novel forms of circuit controllers so constructed as to permit operation thereof by a lateral shifting of the foot levers, thus permitting an operator to actuate such levers when his feet are removed from or applied to the clutch and brake pedals.

I will describe one form of direction-signaling apparatus embodying my invention, and will then point out the novel features thereof in claims.

In the accompanying drawings:

Figure 1 is a view showing in phantom an automobile having applied thereto one form of direction-signaling apparatus embodying my invention.

Figure 2 is a bottom plan view of the several circuit controllers showing the manner in which they are applied to the under side of the floor of a motor vehicle.

Figure 3 is a view showing in side elevation the several circuit controllers shown in Figure 2.

Figure 4 is a longitudinal sectional view taken on the line 4—4 of Figure 2.

Figures 5, 6 and 7 are vertical sectional views taken on the lines 5—5, 6—6, and 7—7, respectively of Fig. 4.

Figure 8 is a view showing in front elevation the brake and clutch pedals of a motor vehicle with the circuit controller actuating levers applied thereto.

Figure 9 is a view showing in side elevation the pedals and levers shown in Figure 8.

Figure 10 is a view showing diagrammatically the lamp circuits and the manner in which the several circuit controllers are associated with such circuits.

Similar reference characters refer to similar parts in each of the several views.

Referring to Figure 10, my invention, briefly described comprises a pair of lamps $R'$ and $R^2$ and a second pair of lamps $L'$ and $L^2$, the lamps $R'$ and $L'$ being arranged at the rear of the vehicle, and the lamps $L^2$ and $R^2$ being arranged at the forward end of the vehicle, preferably in the manner shown in Figure 1. The lamps $R'$ and $R^2$ are provided with a circuit which is controlled by a circuit controller designated generally at C. Similarly, lamps $L'$ and $L^2$ are provided with a circuit controlled by a circuit controller designated generally at $C'$. Current is supplied to each of these lamp circuits from a common source of current which in the present instance is shown as a battery B, and both circuits are adapted to be controlled independently of the circuit controllers C and $C'$ by a third circuit controller designated generally at $C^2$. The circuit controllers C and $C'$ are adapted to be actuated by actuating levers A and $A'$, respectively, and the circuit controller $C^2$ by a similar lever $A^2$, all of such levers extending through the floor of a motor vehicle and laterally shiftable to move the circuit controllers to closed position. The circuit controller C, when in closed position effects an illumination of the lamps $R'$ and $R^2$ to indicate that the driver of the vehicle is about to turn to the right while the closing of the circuit controller $C'$ likewise effects an illumination of the lamps $L'$ and $L^2$ to indicate that the driver of the vehicle is about to turn to the left. The closing of the circuit controller $C^2$ effects the illumination of both pairs of lamps for the purpose of indicating diminution of speed.

Referring now to Figures 2 to 7 inclusive,

F designates the floor of the motor vehicle which is formed with a suitable opening for the reception of the circuit controllers C, C' and C². These openings are spanned by a plate P formed with suitable slots through which the actuating levers A, A' and A² extend. The circuit controllers C and C' are identical in construction and are arranged in opposing relation to each other in the manner clearly illustrated in Figure 4. Each circuit controller C or C' comprises a rectangular shaped yoke 15 or 15ª mounted for rocking movement within and between a pair of ears 16 or 16ª by means of a pin 17 or 17ª. The ears 16 and 16ª are secured in depending relation to the under-side of the floor F by means of screws 18 in the manner shown in Figure 2. As shown in Figure 6, the upper end of the yoke 15 or 15ª is concaved to accommodate a bar 19 or 19ª having a curved surface corresponding in curvature to the end of the yoke. Each bar is pivotally supported on a pin 20 or 20ª secured to the side portions of the yoke. It is to be particularly noted that the side portions of the yoke are preferably formed of strips of lighter but harder metal than the metal of which the main body of the yoke is formed. In practice, it is preferable that the yoke body be formed of lead although any other metal having the requisite weight can be employed. Extending through the bars 19 and 19ª are rods 21 and 21ª which as shown in Figure 4 are connected at their confronting ends by means of a coil contractile spring 22. Mounted upon the extended portions of the rods 21 and 21ª are the actuating levers A' and A, respectively, such levers being locked against longitudinal movement on the rods by means of nuts 23 and 23ª. The levers A and A' are, however, capable of swinging movement upon the rods, the nuts 23 and 23ª being arranged to loosely embrace washers 24 and 24ª interposed between the levers and the bars 19 and 19ª.

Each yoke 15 or 15ª rigidly carries an arm 25 or 25ª formed of insulating material and secured to the yoke by a relatively rigid wire 26 or 26ª which extends through and embraces the yoke in the manner shown. Each arm 25 or 25ª carries a movable contact bar 27 or 27ª secured thereto by bolts 28 or 28ª, such contact bars being disposed at right angles to the arms. Each contact bar 27 or 27ª is adapted to engage and bridge a pair of stationary contact bars 29 or 29ª and to thereby effect an electrical connection between the two. As illustrated to advantage in Figure 5, each pair of contact bars 29 or 29ª are secured to the under side of a pair of blocks 30, the latter in turn being secured to the under side of the floor F. The contact bars 29 or 29ª are preferably of U-shaped formation as shown in Figure 5 and are preferably formed of resilient metal so as to provide the proper cushioning means for the movable contact bars 27 and 27ª when the latter engage the same. The stationary contact bars 29 and 29ª are provided with binding posts 31 to which conducting wires are adapted to be connected in such manner that the bars form the terminals of the circuits for the lamps R', R², and L', L².

The circuit controller C² is similar in construction to the circuit controllers C and C' in that it includes a yoke 15ᶜ mounted for rocking movement by means of a pin 17ᶜ journaled in ears 16ᶜ secured to the under side of the floor F. The yoke 15ᶜ slightly differs in construction from the yokes 15 and 15ª as shown in Figure 7 but rockingly supports a bar 19ᶜ in a similar manner. Extending through the bar 19ᶜ is a rod 21ᶜ upon which is pivotally mounted the lower end of the actuating lever A². The actuating lever A² is confined upon the rod 21ᶜ by means of a nut 23ᶜ, and interposed between the lever ends and the nut 23ᶜ is a plate 34 to which is connected one end of a coiled contractile spring 35. The opposite end of the spring 35 is secured to the under side of the floor F at the point indicated at 36, such spring serving to bias or urge the yoke 15ᶜ and consequently the lever A² to the right as when viewed in Figure 4. Embracing the rod 21ᶜ is one end of a yoke 37 which is bent to overlie the bar 19ᶜ with its opposite end bent and formed with an opening through which extends a rod 38 which is threaded to threadedly engage the yoke 37, and is securely locked to the yoke by means of a nut 39. The free end of the rod 39 is bent to engage a plate 40 secured to a block 41 formed of insulating material. As shown in Figure 5, the block 41 is mounted for sliding movement between the blocks and is secured against lateral displacement by means of tongues 42 which slidably fit within correspondingly shaped grooves formed in the confronting edges of the blocks 30. The insulating block 41 carries a pair of contact bars 43 and 43ª which are adapted to engage, respectively, contact fingers 44 and 44ª mounted between the parallel portions of the stationary contact bars 29 and 29ª and secured to the binding posts 31 in the manner clearly shown in Figure 4.

In the operation of the circuit controller C', the spring 22 normally biases or urges the yoke 15 to such position that the movable contact bar 27 is out of contact with the stationary contact bars 29. However, when the actuating lever A' is moved to the left from the position shown in Figure 4, a rocking of the yoke 15 is effected to cause the contact bar 27 to engage and bridge the contact bars 29. This position of the contact bar 27 is maintained as long as lateral pressure is exerted on the actuating lever, but when such pressure is discontinued, spring 22 returns the yoke 15 to normal position thereby moving the contact bar 27 out of engagement with the contact bars 29.

The operation of the circuit controller C is identical to that of the circuit controller C' with the exception that the actuating lever A is moved to the right as when viewed in Figure 4, thereby causing the contact bar 27$^a$ to engage the contact bar 29$^a$.

In the operation of the circuit controller C$^2$ the spring 35 serves to bias the yoke 15$^c$ to such a position that the block 41 is in its extreme right hand position. In this position of the block, the contact bars 43 and 43$^a$ are out of engagement with the contact fingers 44 and 44$^a$. However, when the actuating lever A$^2$ is moved to the left from the position shown in Figure 4, the block 41 is slid forwardly between the blocks 36 thereby causing the contact bars 43 and 43$^a$ to engage the contact fingers 44 and 44$^a$. When the pressure upon the lever A$^2$ is discontinued, the spring 35 returns the block to its normal position thereby moving the contacts out of engagement with each other.

In the applied position of the apparatus to an automobile, the several actuating levers A, A' and A$^2$ project above the floor F of the motor vehicle and slidably fit within rings 45 formed on the clutch pedal and the brake pedal, designated at K and B', respectively, in Figure 8. In this position of the actuating levers, it will be clear that the driver of the motor vehicle can readily effect a lateral shifting of the levers with his feet, it being understood that with one foot adjacent to or actually on the clutch pedal K, it is only necessary to swing the foot to the left to actuate the lever A', and to the right to actuate the lever A. If his foot is not upon the clutch pedal but is resting upon the floor of the vehicle, actuation of either lever A or A' will be effected by a lateral shifting of the toe. However, when the foot is actually upon the pedal either lever can be actuated with the heel of the foot. The lever A$^2$ can be likewise actuated by the right foot of the driver, and irrespective of whether the foot is actually upon or adjacent to the brake pedal.

The operation of the entire apparatus is as follows: By referring to Figure 10, it will be seen that with all of the circuit controllers in open position, neither of the circuits are closed so that none of the lamps are illuminated. When it is desired to signal to pedestrians and drivers of other vehicles that it is intended to turn to the right, the driver of the vehicle laterally shifts the actuating lever A to the right as viewed in Figure 8 thereby closing the circuit controller C. With the closing of the circuit controller C, the lamps R' and R$^2$ are illuminated through the following circuit: from the positive side of the battery B through wire 46, switch socket 47, wire 48, lamp R', wire 49, lamp R$^2$, wire 50, stationary contact 29$^a$, movable contact 27$^a$, stationary contact 29$^a$, wire 51, switch socket 47 and wire 52 back to the negative side of the battery B. As the lamps R' and R$^2$ are arranged at opposite ends of the vehicle, it will be clear that indications are given at both the front and rear of the vehicle.

When it is desired to signal the fact that the driver intends to turn to the left, the actuating lever A' is laterally shifted, thereby closing the circuit controller C' and illuminating the lamps L' and L$^2$ through the following circuit: from battery B through wire 46, switch socket 47, wire 53, lamp L$^2$, wire 54, lamp L', wire 55, stationary contact 29, movable contact 27, stationary contact 29, wire 56, switch socket 47, and wire 52 back to battery. As the lamps L' and L$^2$ are also arranged at the opposite ends of the vehicle, indications are given at both the front and rear ends of the vehicle.

When it is desired to indicate that it is the driver's intention to diminish the speed of travel, the lever A$^2$ is shifted to the left as viewed in Figure 8 thereby closing the circuit controller C$^2$ and illuminating all of the lamps by reason of the contact bars 43 and 43$^a$ engaging respectively the contact fingers 44 and 44$^a$ thereby bridging each set of contact bars 29 and 29$^a$. As shown, the switch socket 47 is provided with two plugs, but it is to be understood that any other form of electrical connection may be provided for effecting the proper connection between the several wires.

Although I have herein shown and described only one form of direction-signaling apparatus, it is to be understood that various changes and modifications may be made herein without departing from the spirit of the invention and the spirit and scope of the appended claims.

What I claim is:

1. A circuit controller comprising, a yoke mounted for swinging movement, an arm fixed to the yoke, a contact bar fixed to said arm, stationary contacts disposed in the path of movement of said contact bar, a spring for biasing the yoke to a position wherein said contact bar disengages the contacts, and an actuating lever pivotally connected to the yoke so that when moved laterally a rocking of the yoke is effected against the action of said spring to cause the contact bar to engage said contacts.

2. A circuit controller comprising, stationary contacts, a movable contact, an arm supporting the movable contact, a yoke mounted for swinging movement and rigidly connected to said arm, a bar pivoted on the yoke, a rod extending through said bar, a spring connected to the rod for biasing the yoke to a position wherein the movable contact disengages the stationary contacts, and an actuating lever pivotally supported on said rod and adapted to be moved laterally to effect movement of the yoke to cause said movable contact to engage the stationary contacts.

3. A circuit controller comprising a pair of insulating blocks, a third insulating block mounted for sliding movement between the first insulating blocks, stationary contacts fixed to the first blocks, movable contacts carried by the third block, a yoke mounted for swinging movement and operatively connected to the third block, a spring for biasing the yoke to a position wherein the movable contacts disengage the stationary contacts, and an actuating lever connected to said yoke for effecting movement of the latter against said biasing means to cause the movable contacts to engage the stationary contacts.

4. A circuit controller comprising, stationary contacts, an insulating block, movable contacts fixed to the insulating block, a yoke mounted for swinging movement in a manner to effect reciprocation of the insulating block to cause the movable contacts to engage or disengage the stationary contacts, means for biasing the block to a position wherein the movable contacts disengage the stationary contacts, and an actuating lever connected to the yoke for moving the latter against the action of said biasing means.

5. In combination, a pair of circuit controllers comprising insulating blocks, stationary contacts fixed to said insulating blocks, a pair of yokes mounted for swinging movement, arms fixed to the yokes, movable contacts fixed to said arms, a spring connecting the yokes for biasing the latter to a position wherein the movable contacts disengage the stationary contacts, and a third circuit controller comprising an insulating block movable between the first two insulating blocks, movable contacts carried by the third insulating block and adapted to engage the stationary contacts, a yoke mounted for swinging movement and operatively connected to the third insulating block for effecting a reciprocating movement thereof, a spring for biasing the yoke to a position wherein the movable contacts disengage the stationary contacts, and actuating levers for all of the circuit controllers, said levers being connected to said yokes so that when shifted laterally a swinging of the yokes is effected against the tension of the springs to cause the movable contacts to engage the stationary contacts.

6. A circuit controller comprising, a yoke mounted for swinging movement, a bar pivoted on the yoke, a rod extending through the bar, a second yoke fixed to said bar, a second rod fixed to said second yoke, an insulating block connected to said second rod, movable contacts carried by the insulating blocks, stationary contacts disposed in the path of movement of the movable contacts, a spring connected to the first rod for biasing the first yoke to a position wherein the movable contacts disengage the stationary contacts, and an actuating lever pivotally mounted on the first rod and adapted when moved laterally to effect movement of the first yoke against the action of said spring to move the movable contacts into engagement with the stationary contacts.

7. In combination, a plurality of circuit controllers comprising yokes mounted for rocking movement, stationary contacts, movable contacts carried by said yokes and adapted to engage the stationary contacts, means for biasing the yokes to positions wherein the movable contacts disengage the stationary contacts, and actuating levers operatively connected to said yokes in such manner that when moved laterally an actuation of the yokes is effected against the action of said biasing means to cause the movable contacts to engage the stationary contacts.

8. In combination, a pair of circuit controllers including stationary contacts and rockable contacts, and a third circuit controller including the stationary contacts of the first circuit controllers and movable contacts mounted for reciprocation to engage and disengage the stationary contacts.

9. In combination, a pair of circuit controllers including stationary contacts and rockable contacts, a third circuit controller including the stationary contacts of the first circuit controllers and movable contacts mounted for reciprocation to engage and disengage the stationary contacts, and levers for each of the circuit controllers mounted for movement in two directions and adapted to be associated with the clutch and brake pedals of a motor vehicle to permit unrestricted movement of the pedals and to allow of independent movement of the levers to effect actuation of the circuit controllers.

10. In combination, a foot lever, an electric circuit control having an actuating lever positioned adjacent the foot lever and adapted for lateral movement for making and breaking the electric circuits controlled thereby, and means for connecting the circuit actuating lever through the foot lever to permit free operative movement of each lever and also maintain the circuit actuating lever in position to be operated by an operator's foot upon the foot lever at all positions the foot lever may assume during the operative movements thereof.

11. In combination, a foot lever, an electric circuit control having an actuating lever with a curved portion extending adjacent said foot lever, said actuating lever being adapted for lateral movement with relation to the foot lever for making and breaking the electrical circuits controlled thereby, and a ring carried by the foot lever loosely encircling the electric control actuating lever whereby free operative movements of each lever may be had and the circuit actuating lever maintained in the same relative position during the operative movements of the foot lever.

HARRY GILMORE CLIFTON. [L. S.]